Jan. 4, 1927.

R. C. STEVENS 1,613,581

RELEASING POPPET VALVE GEAR

Filed July 24, 1923     4 Sheets-Sheet 1

INVENTOR
Robert C. Stevens
BY
Geo. B. Willcox
ATTORNEY

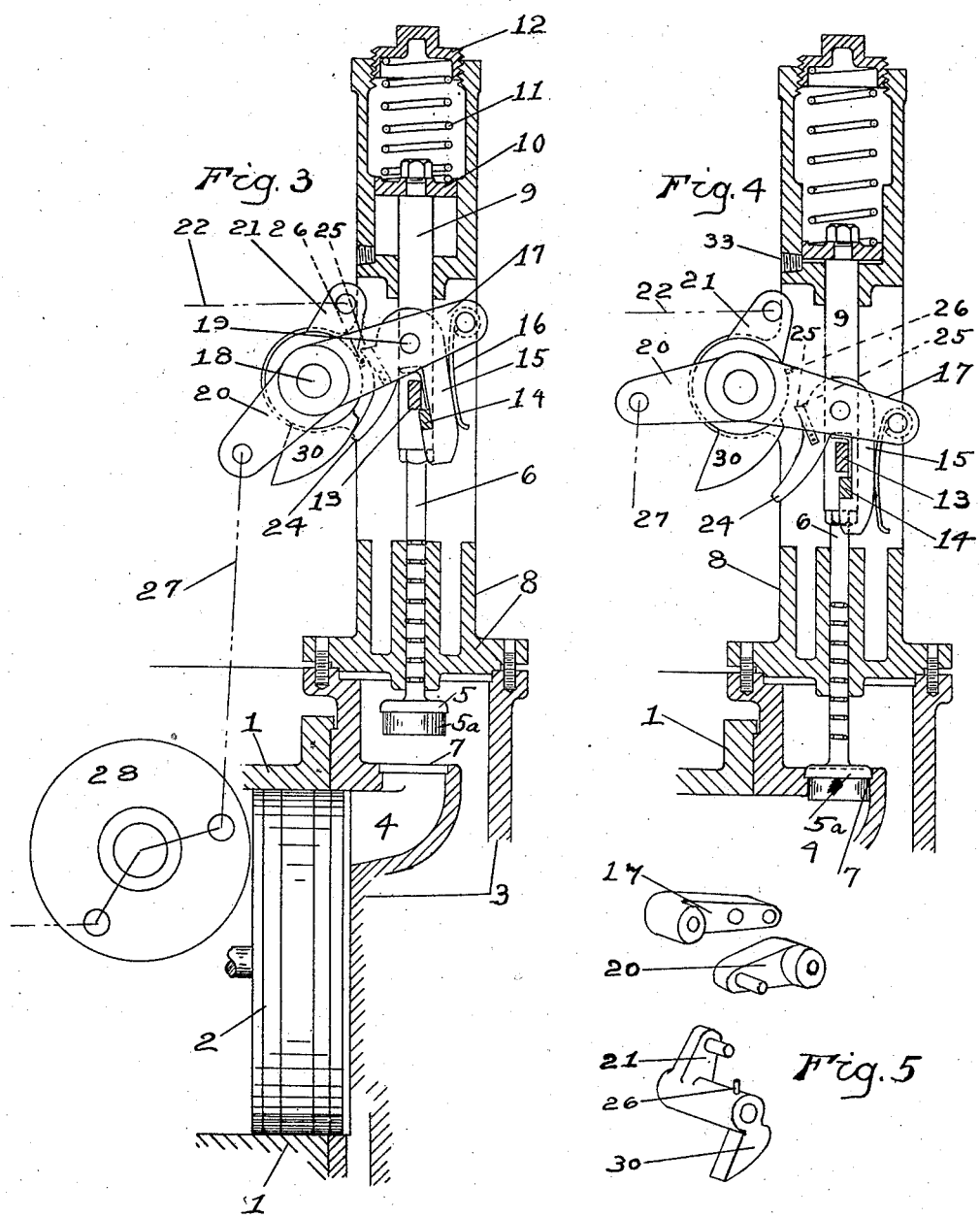

Jan. 4, 1927.

R. C. STEVENS 1,613,581

RELEASING POPPET VALVE GEAR

Filed July 24, 1923    4 Sheets-Sheet 4

INVENTOR
Robert C. Stevens
BY
Geo. Butler
ATTORNEY

Patented Jan. 4, 1927.

1,613,581

UNITED STATES PATENT OFFICE.

ROBERT C. STEVENS, OF ERIE, PENNSYLVANIA.

RELEASING POPPET-VALVE GEAR.

Application filed July 24, 1923. Serial No. 653,463.

This invention relates to releasing poppet valve gears for steam engines. The improvement embodies a valve mechanism of simple and relatively inexpensive construction adaptable to either counterflow or uniflow engines, the parts being so designed and arranged as to maintain their initial accuracy of adjustment and precision of operation notwithstanding considerable wear may meanwhile have occurred through long continued service.

The objects of my invention with respect to efficiency of operation are to produce an engine capable of high speed, yet having the advantageous steam distribution features of a Corliss type of wrist-plate and releasing valve-actuating gear and spindle governor, together with the quick, light, full opening characteristics of a simple spring-actuated poppet valve, to which I have added structural features that enable the poppet valve to operate with quick opening, quick cut-off or closing and cushioning effects not heretofore attained by poppet valves.

My improved combination further makes available in one engine structure the well known operating advantages of wrist-plate valve actuation, together with all of the desirable features of a poppet-valve releasing gear, including quiet action at high speeds, large port opening at all cut-offs, quick valve functioning both on opening and closing, rapid but quiet catch plate action and quiet valve closure; the various mechanical elements as combined in my engine producing a high speed machine of great economy and flexibility of operation, and one that gives a proper indicator card.

With the foregoing and certain other objects in view which will appear later in the specifications my invention comprises the devices described and claimed and the equivalents thereof.

In the drawings Fig. 1 is a diagrammatic side view of my valve gear as applied to a uniflow engine.

Fig. 3 is a longitudinal section through the valve bonnet and releasing gear, the valve lifted.

Fig. 4 is a similar view showing the valve seated.

Fig. 5 is a detail of the valve-lifting levers and knock-off cam.

Figure 1:
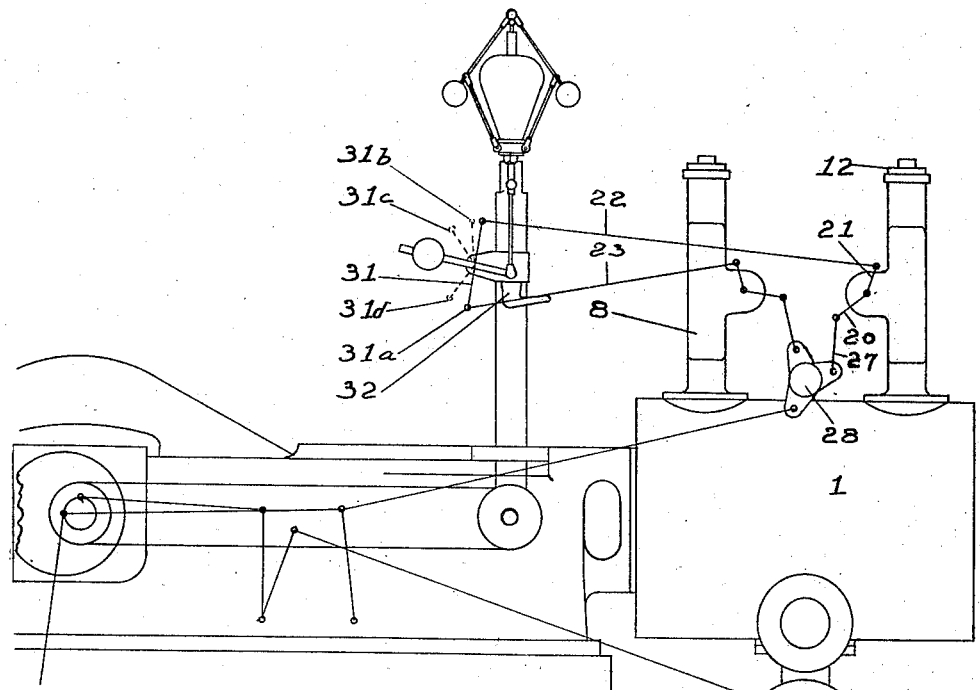

1 is the engine cylinder, which may be of the uniflow or counterflow type. 2 is the piston and 3 the cylinder head, shown steam jacketed.

The steam port 4, Fig. 3, connects the hollow cylinder head or steam chest with the cylinder, and 5 is my improved piston-poppet valve, that is, a poppet valve with a piston extension, as $5^a$, thereon. This piston extension need not be fitted with packing rings. 6 is the valve stem and 7 the poppet valve seat.

The valve bonnet 8 carries the valve-actuating mechanism. The valve stem has a guide-rod extension 9 and a dash pot piston 10 and compression spring 11, which may be adjusted by means of a threaded plug 12.

Attached to the rod extension 9 is a catch plate 13 and a similar catch plate 14 is carried by a lifting hook 15.

The catch plate 14 is normally pressed toward catch plate 13 by a spring 16 that presses against the back of the hook 15.

A lifting lever 17 is keyed to an oscillating shaft 18 carried by the valve bonnet and has a pin 19 upon which lifting hook 15 is pivoted. A lifting lever 20 is also keyed to shaft 18 and actuates lever 17.

21 is an arm having a hub which turns on shaft 18. The outer end of arm 21 is connected to the corresponding arm of the spindle governor, or any other suitable type of governor, by rods 22, 23 respectively, as shown in Fig. 1.

The lifting hook 15 is preferably formed with a curved prong 24 and has a projection 25, preferably a flat spring, which engages with a pin 26 on the hub of arm 21. I term this a safety pin because it acts as a safety stop as will be described. 27 is a rod that connects lifting lever 20 with a wrist-plate 28, which is actuated in the usual manner from a suitable eccentric 29. A valve-releasing knock-off cam 30 is fixed to the hub of arm 21, being preferably formed integral therewith as shown in Fig. 5 and adapted to engage prong 24.

Figure 7:
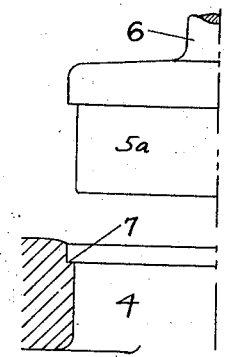
Figs. 7, 8, 9, 10 are diagrammatic views showing various positions of the valve relative to its seat.
Figure 11:
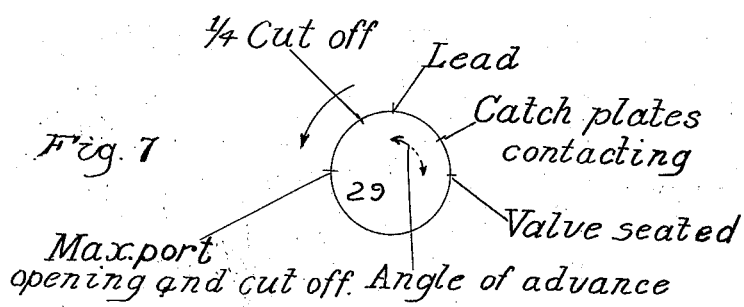
Fig. 11 is a diagram indicating various positions of the eccentric.
Figure 8:
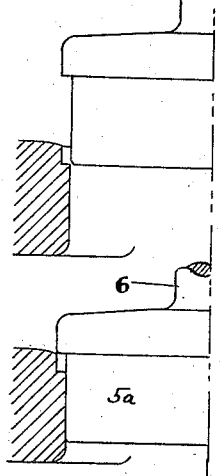
Figure 9:
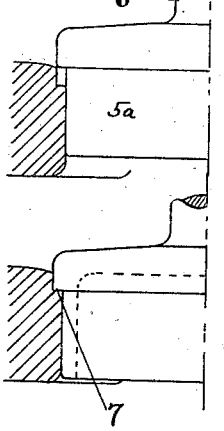
Figure 12:
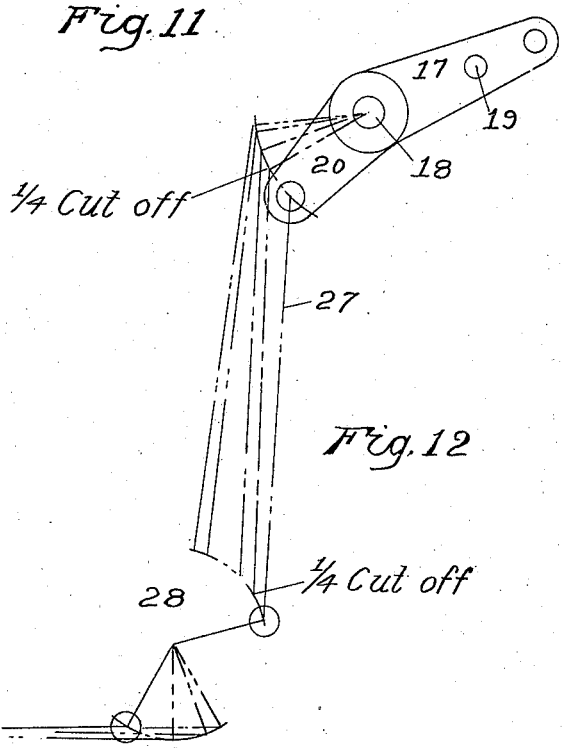
Fig. 12 is a diagrammatic view showing the mode of operation of the wrist-plate and its connected valve gear.
Figure 10:
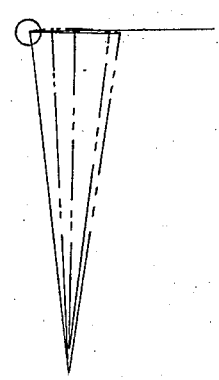

The cycle is as follows:

Referring to Fig. 3, the valve is shown in position of maximum opening and the hook 15 and other parts are in corresponding positions, the catch plates 13, 14 being just in the act of disengaging. This position corresponds to the maximum cut-off position of the eccentric in the diagram, Fig. 11. Fig. 7 shows the valve open a lesser amount, but still an unusually large opening, at position of quarter cut-off. The eccentric at such times is at point marked "¼ cut-off" in Fig. 11, the catch plates being just on the point of disengaging. While the eccentric is going from position of any cut-off in Fig. 11 to extreme position "Valve seated", the valve has passed through the successive positions of cut-off, Fig. 8, cushion Fig. 9 and seating Fig. 10. Next the catch plates arrive in position for subsequent contact, as shown in Fig. 4, with the eccentric and parts at point "Valve seated" in Fig. 11. Contact of plates takes place at point marked "Catch plates contacting". A little later the valve opens for lead as shown in Fig. 8.

Knock-off cam 30 contacts with the prong 24 from its small end for long cut-off to its large end for shortest cut-off. In normal longest cut-off, or starting position, the arm 31 is maintained at position 31ª, Fig. 1, by the usual trip cam 32 and in such position or at still shorter cut-offs the pin 26 is rolled away so it does not contact with the prong 24. The purpose of the cam 32, as is common in Corliss engines, is to raise the governor so that its rods 22 and 23 will pull the pin 26 out of the way so as to permit the hooks 14 and 15 to engage at the time of starting. As soon as the engine is up to speed, the governor balls will have raised and thereby pulled the arm 31 to positions of shorter cut-offs, as for example 31ᵇ, which is approximately quarter cut-off, up to position 31ᶜ, of minimum or zero cut-off. When the governor has assumed these positions for shorter, or working cut-offs, the trip cam 32 will have fallen down so that it will be out of the way.

Should the governor belt break, letting the balls drop and the governor arm 31 go to position 31ᵈ, the pin 26 on the hub of 21 will contact with prong 25 on hook 15 and disengage the catch plates, so as to prevent the valve opening and the engine running away.

As above noted, a projection 25 may be placed on the side of the hook 15. The projection is preferably in the form, say, of a spring bolted or riveted to the hook. This projection on its upward movement will pass the pin 26 in all working positions of the arm 17, but as stated, should the belt or chain driving the governor break, the arm 31 will take the position 31ᵈ, Fig. 1, and the spring or projection 25 will then on its upward stroke engage the pin 26. The catch plates 13 and 14 will not engage and the valve will not be opened. The hook 15 and projection 25 will, however, go on up with the movement of the arm 17 and when these parts again come down the spring 25 will pass the pin 26 and be in position to repeat the cycle.

I will now review some of the more important operating advantages of my combined wrist-plate, poppet valve and lifting gear, which are; A quick opening from "Lead" to cut-off, whether this cut-off is at maximum, or at intermediate points, as for example one quarter cut-off. The time to cut-off of course varies with changes of the load on the engine; but the wide quick opening of the port is always secured. Obviously, one quarter cut-off is at the same point in a stroke whether the valve gear is operated with the usual cam motion or with a releasing hook motion, but in the case of the usual cam-opened valve, one half of the time between dead center and cut-off is spent in opening the valve and the other half in closing the valve; whereas with the releasing hook motion herein described practically all the time between dead center and cut-off is spent in opening the valve, with the result that the valve can be opened wider. The indicator card consequently shows a better steam line and sharper cut-off.

As is well known the common Corliss type of wrist-plate gear produces acceleration of a piston-valve at the proper piston positions, and is well adapted to actuate piston valves that have lap, but poppet valves as applied to steam engines generally have hitherto taken their motion direct from an eccentric. They do not permit as quick opening of the valve as my improved construction does, except at the risk of much lost motion between the hook plates, which in turn prevents high speed because of noise. Moreover, the releasing gear usually employed with poppet valves does not permit quick valve closure at high speeds because of the necessary slowing up due to the cushioning of the valve by dash pots or the like which are necessary with such poppet valve releasing gear. To overcome these and other disadvantages and to secure quick opening and dwell I, therefore, combine with a wrist-plate and a suitable catch-plate releasing gear the form of poppet valve herein described or the equivalents of it, instead of a piston valve. I have illustrated my improvement as applied to a single seated valve, but it may when desired be adapted to double seated valves.

My improved poppet valve avoids the above-mentioned defects of piston valves operated by wrist-plate releasing gears and makes possible the employment of single seat poppet valves constructed with lap and consequent high speed operation. It may be noted that single seat poppet valves are desirable in this combination because they have no attached levers and consequently little inertia. They also give greatly increased valve opening in proportion to their size and are more dependable as regards steam tightness than piston valves. Ordinary poppet valves have not heretofore usually been made with lap, but open and close by simple contact. My combination of wrist-plate operation with a poppet valve made with lap has the advantages both of wrist-plate acceleration of movement and also capacity for larger opening in proportion to the size and weight of the valve.

Figure 2:
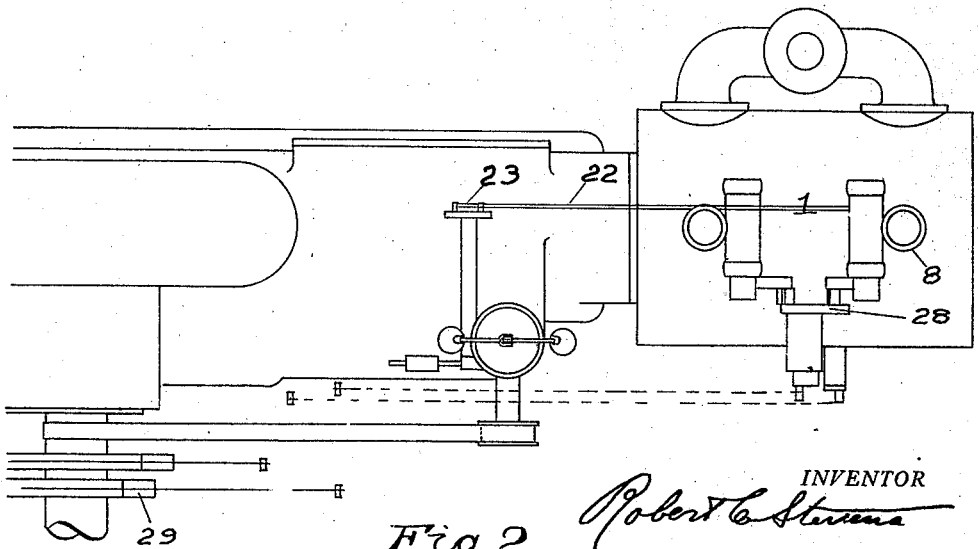
Fig. 2 is a top plan view of the same.
Figure 6:
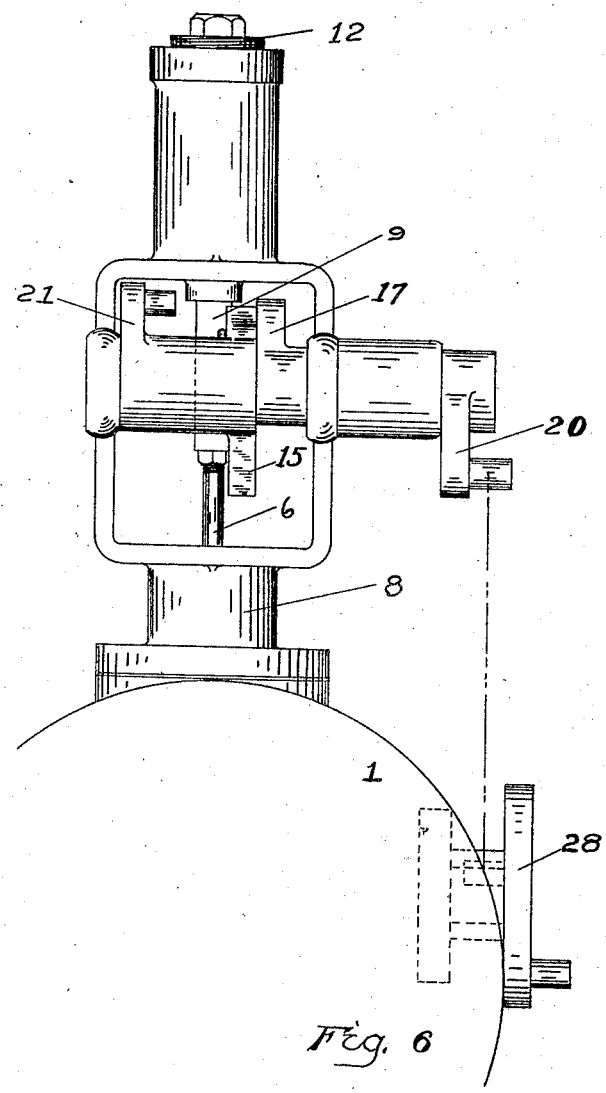
Fig. 6 is an end view of the cylinder and valve bonnet.

In Figs. 1, 2 and 3 I show a short piston uniflow engine equipped with my new gear and a spindle governor. This general type of gear and governor are equally adaptable to a long piston uniflow or to a counterflow. In any uniflow, however, where the compression should mount to the initial pressure the single seat poppet valve is suitable, for it then becomes practically balanced.

By putting a piston extension 5ª on the poppet valve and then cutting the seat perhaps three sixteenths inch low, I cause the valve, which has been turned to two different diameters to suit the seat bore and counterbore, to catch and imprison a certain quantity of steam, which then gradually leaks out and lets the valve come to its seat gently. The cushioning does not delay cut-off, because that event has taken place prior to cushioning. When high pressure steam is doing the cushioning, this cushion seat will alone quiet the valve at closing, without the use of any dash pot. Some dash pot effect may, however, be secured when necessary, by the piston 10 and a pressure relief valve, not shown, may be attached to the bonnet at 33.

The valve diameters do not tend to reduce by wear, because the valve is vertical, so the desired cushioning effect is maintained indefinitely. Moreover the "two laps" as it were, will give a considerable seal against steam leakage; but, when the valve is finally seated, it will be steam tight on its poppet seat. During expansion and exhaust there is plenty of time for the valve to seat. The cushioned poppet valve has the further advantage of avoiding wear or hammering the valve seat.

With the arrangement described above very late cut-off is attainable, even up to eighty per cent of the stroke if desired. Wide valve opening is attained equally well at all cut-off points, as for example, full port opening at quarter cut-off, which is about four times the opening heretofore commonly attained with cam-actuated valve lifting gears.

The point of cut-off may be regulated by a spindle governor of any usual type as shown, or the cut-off may be hand adjusted if desired. Speed is regulatable while the engine is running, a feature desirable for the operating of alternators in parallel and for running pumps, compressors, fans etc.

In this invention I have produced a valve-lifting and releasing gear especially well adapted for operatively connecting a piston-poppet valve with a co-operating wrist-plate actuated releasing gear and eccentric, whereby to attain properly timed valve acceleration, wide opening and quick release.

Having thus described my invention, what I claim and desire to secure by Letters Patent is:

1. In combination a uniflow engine having an eccentric, a port opening formed with an annular valve seat, a poppet valve having a shoulder and a piston extension, said piston extension longitudinally slidable in said opening, a circular rim on said piston of larger diameter than said piston extension, said valve seat counterbored to receive said shoulder and form an annular cushioning chamber, a valve-lifting device operatively connected to said poppet valve including a pair of catch plates, a wrist-plate operatively connected to said valve-lifting device and to said eccentric and a spindle governor for regulating the operation of said valve-lifting device.

2. In a steam engine having an eccentric, a steam port formed with an annular valve seat, a poppet valve having a piston extension thereon and longitudinally slidable in said opening, a valve-lifting device including a pair of catch plates, a wrist-plate and operating links connecting said wrist-plate to said eccentric and to said valve-lifting device.

In testimony whereof, I affix my signature.

ROBERT C. STEVENS.